(12) United States Patent
Atarius et al.

(10) Patent No.: US 6,606,363 B1
(45) Date of Patent: Aug. 12, 2003

(54) METHOD AND APPARATUS FOR ESTIMATING A FREQUENCY OFFSET BY COMBINING PILOT SYMBOLS AND DATA SYMBOLS

(75) Inventors: Roozbeh Atarius, Lund (SE); Rajaram Ramesh, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/473,927

(22) Filed: Dec. 28, 1999

(51) Int. Cl.[7] ............................................. H04L 7/04
(52) U.S. Cl. .................................... 375/362; 370/500
(58) Field of Search .............................. 375/362, 364, 375/365, 366, 367, 316, 349, 224; 455/226.1, 226.3; 370/491, 500, 509

(56) References Cited

U.S. PATENT DOCUMENTS

| | | |
|---|---|---|
| 4,527,278 A | 7/1985 | Deconche et al. |
| 4,962,507 A | 10/1990 | Renshaw |
| 5,151,925 A | 9/1992 | Gelin et al. |
| 5,680,395 A | 10/1997 | Weaver, Jr. et al. |
| 5,737,327 A | 4/1998 | Ling et al. |
| 5,799,010 A | 8/1998 | Lomp et al. |
| 5,809,020 A | 9/1998 | Bruckert et al. |
| 5,870,378 A | 2/1999 | Huang et al. |
| 5,898,665 A | 4/1999 | Sawahashi et al. |
| 6,002,710 A | 12/1999 | Hendrickson et al. |
| 6,032,033 A * | 2/2000 | Morris et al. ............. 455/277.2 |
| 6,097,770 A * | 8/2000 | Bahai et al. .................. 375/343 |
| 6,219,391 B1 * | 4/2001 | Nakano ........................ 375/346 |
| 6,363,102 B1 * | 3/2002 | Ling et al. .................... 375/147 |

FOREIGN PATENT DOCUMENTS

| | | |
|---|---|---|
| EP | 0 858 197 | 8/1998 |
| WO | 98/54875 | 12/1998 |

* cited by examiner

*Primary Examiner*—Jean Corrielus
(74) *Attorney, Agent, or Firm*—Burns, Doane, Swecker & Mathis, L.L.P.

(57) ABSTRACT

A method and apparatus estimate an offset between a carrier frequency of a transmitter and a local reference frequency of a receiver. A received signal is separated into frequency synchronization signals and data, and a determination is made whether the frequency synchronization signals are adequate for estimating the frequency offset. This determination may be made based on, e.g., an estimated Doppler spread, an estimated signal to noise ratio, and/or an available amount of frequency offset estimation time. The frequency offset is estimated based on the determination results. If the frequency synchronization signals are adequate for estimating the frequency offset, the frequency synchronization signals are used for determining the frequency offset. Otherwise, the rate of the frequency synchronization signals is increased, e.g., by using the data as frequency synchronization signals, in which case the data is combined with the frequency synchronization signals to determine the frequency offset.

20 Claims, 5 Drawing Sheets

$f_{off} - f_{Dopp}$   $f_{off}$   $f_{off} + f_{Dopp}$ $f_{off} - f_{Dopp}$   $f_{off}$  $\widehat{f}_{off}$  $f_{off} + f_{Dopp}$

METHOD AND APPARATUS FOR ESTIMATING A FREQUENCY OFFSET BY COMBINING PILOT SYMBOLS AND DATA SYMBOLS

BACKGROUND

This invention relates generally to a method and system for controlling the reference frequency in a radio receiver. More particularly, this invention relates to a method and system for estimating a frequency offset between a carrier frequency of a transmitter and a local reference frequency of a receiver in a communication system.

Modern communication systems, such as cellular radiotelephone systems and satellite radio systems, employ various modes of operation (analog, digital, dual mode, etc.) and access techniques such as frequency division multiple access (FDMA), time division multiple access (TDMA), code division multiple access (CDMA), and hybrids of these techniques.

In North America, a digital cellular radiotelephone system using TDMA is called the Digital Advanced Mobile Phone System (D-AMPS), some of the characteristics of which are specified in the TIA/EIA/IS-136 standard published by the Telecommunications Industry Association and Electronic Industries Association (TIA/EIA). Another digital communication system using direct sequence CDMA is specified by the TIA/EIA/IS-95 standard. There are also frequency hopping TDMA and CDMA communication systems, one of which is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB).

FIG. 1 illustrates an exemplary communication system. The system includes at least one transmitter 100 and at least one receiver 150. Although the transmitter 100 and the receiver 150 are depicted in FIG. 1 as a base station (BS) and a mobile station (MS), respectively, it will be appreciated that the transmitter can be implemented in many ways, e.g., as a terrestrial or satellite repeater, and the receiver can be implemented in many ways, e.g., as a fixed cellular terminal (wireless local loop). A BS and a MS are depicted in FIG. 1 and described in the following for illustrative purposes only.

The BS 100 and the MS 150 communicate via a radio air interface 125. Each neighboring BS 100 is assigned a particular carrier frequency, and each BS 100 allocates specific time slots for each MS 150.

In systems such as the proposed IMT2000 system for the next generation mobile telephony which is based on DS-CDMA, data may be transmitted as symbols in a control channel. The downlink data from the BS is segmented into superframes, each having a duration of 720 ms. Each superframe is divided into 72 frames, a frame having a duration of 10 ms. Each frame is divided into 15 slots, and each slot divided into 2560 chips. Depending on the communication channel, 2560 chips are grouped into a number of symbols. For example, in the Broad Cast Control Channel (BCCH) there are 10 symbols of 256 chips each. A certain number of these symbols are already known and transmitted as pilot symbols from the BS to MSs. FIG. 2 shows the segmentation of the data in the Broad Cast Channel (BCCH).

To communicate with a BS 100, a MS 150 must be time and frequency synchronized to the BS 100. In other words, the local frequency reference and time reference of the MS 150 must be synchronized with the carrier frequency assigned to the BS 100 and the time slot(s) allocated by the BS, respectively. In a CDMA system, the MS 150 must be synchronized with the BS's carrier frequency and the code words transmitted.

To synchronize the MS 150, the BS 100 transmits a frequency synchronization signal, e.g., pilot symbols or pilot groups. The MS 150 receives and demodulates the transmitted frequency synchronization signal in any suitable manner.

In cellular systems, a frequency offset or deviation may exist between the transmitter carrier frequency and the local oscillator of the receiver. The frequency offset results from different factors, including temperature variation, aging, and manufacturing tolerances. To address this offset, a phase ramp can be estimated and compensated for in an Automatic Frequency Control (AFC) control loop. Estimation can be based on the received frequency synchronization signal, e.g., pilot symbols or pilot groups. The frequency offset can be estimated by studying the phases of the pilot symbols in consecutive slots. This is described, e.g., in commonly assigned U.S. Pat. No. 6,104,767, and herein incorporated by references In the mobile radio channel, multi-path is created by reflection of the transmitted signal from obstacles in the environment, e.g., buildings, trees, cars, etc. In general, the mobile radio channel is a time varying multi-path channel due to the relative motion of the structures that create the multi-path.

A characteristic of the multi-path channel is that each path through the channel may have a different phase. For example, if an ideal impulse is transmitted over a multi-path channel, each pulse of the received stream of pulses generally has a different phase from the other received pulses. This can result in signal fading.

The phases of pilot symbols include the frequency offset between the MS and the BS plus the Doppler spread. Typically, the channel is modeled as discrete rays. In a Rayleigh fading radio channel, the frequencies of the path-rays are distributed in a frequency zone of twice the Doppler spread around the frequency offset or deviation between the transmitter carrier frequency and the receiver local reference frequency. This is shown in FIG. 3 which illustrates a distribution of frequencies in a zone $f_{off}-f_{Dopp}$ and $f_{off}+f_{Dopp}$ including the Doppler spread $f_{Dopp}$ around a frequency offset $f_{off}$.

A large Doppler spread may complicate estimation of the frequency offset. For example, the quantity of the Doppler spread in combination with the frequency offset can exceed the rate of receipt of the pilot symbols. Hence, the frequency offset cannot reliably be estimated based on consecutive pilot symbols or pilot groups. Even if the total frequency offset is slightly less than the pilot receipt rate, it has been observed that the quality of the estimate is not satisfactory. To prevent aliasing, the rate of receipt should ideally be at least twice the frequency offset.

Estimation of the frequency offset in time limited applications, such as idle MS mode when the MS has a short time to estimate the frequency offset, can also be a problem.

In this time-limited scenario, the frequencies of the received path-rays may not be distributed around the frequency offset as in FIG. 3. They may be distributed as in FIG. 4 in which the dotted curve shows the frequency zone of the received path-rays in the limited time. This will result in a biased frequency offset estimate indicated in FIG. 4 by the denotation "Λ".

A further concern is a low Signal-to-Noise Ratio (SNR), which affects the detected phases of the pilot symbols and thereby affects the estimated frequency offset.

Whether due to the Doppler spread, limited frequency offset estimation time, low SNR, or some other factor the received pilot symbols may not be adequate for determining the frequency offset. There is thus a need for a technique for reliably estimating the frequency offset in situations where the pilot symbols are not adequate.

SUMMARY

It is therefore an object of the present invention to provide a technique for synchronizing a remote station to a communication network even where the synchronization signals from the communication network are not adequate.

According to exemplary embodiments, this and other objects are met by a method and apparatus for estimating an offset between a carrier frequency of a transmitter and a local reference frequency of a receiver. A received signal is separated into frequency synchronization signals and data, and a determination is made whether the frequency synchronization signals are adequate for estimating the frequency offset. This determination may be made based on, e.g., an estimated Doppler spread, an estimated signal to noise ratio, and/or an available amount of frequency offset estimation time. The frequency offset is estimated based on the determination results. If the frequency synchronization signals are adequate for estimating the frequency offset, the frequency synchronization signals are used for determining the frequency offset. Otherwise, the rate of the frequency synchronization signals is increased, e.g., by using the received data as frequency synchronization signals, in which case the data is combined with the frequency synchronization signals to determine the frequency offset.

BRIEF DESCRIPTION OF THE DRAWINGS

The features, objects, and advantages of this invention will become apparent by reading this description in conjunction with the accompanying drawings, in which like reference numerals refer to like elements and in which.

DETAILED DESCRIPTION

For illustrative purposes, the following description is directed to a cellular radio communication system, but it will be understood that this invention is not so limited and applies to other types of communication systems.

For synchronous communication between a transmitter, e.g., a BS, and a receiver e.g., an MS, a frequency offset between the carrier frequency of the transmitter and the local reference frequency of the receiver must be estimated and taken into account. The statistical properties of the frequency offset estimate deteriorate when the Doppler spread increases, the estimate must be computed in a limited time, and/or the SNR is low. In situations such as these, the pilot symbols might not be adequate for determining the frequency offset.

According to exemplary embodiments, such problems are solved by increasing the rate of the pilot symbols or pilot groups. If the MS has no further access to the pilot symbols than those transmitted by the BS, according to an exemplary embodiment, this object can be achieved by interpreting the data symbols received from the BS as pilot symbols. The phases of the pilot symbols and the data symbols may be combined to estimate the frequency offset. Of course, the received data is not a priori known and must first be estimated. Hence, estimation errors may arise that result in a deteriorated estimated frequency offset. Employing data symbols as pilot symbols should be therefore avoided if it is not needed.

Figure 5:
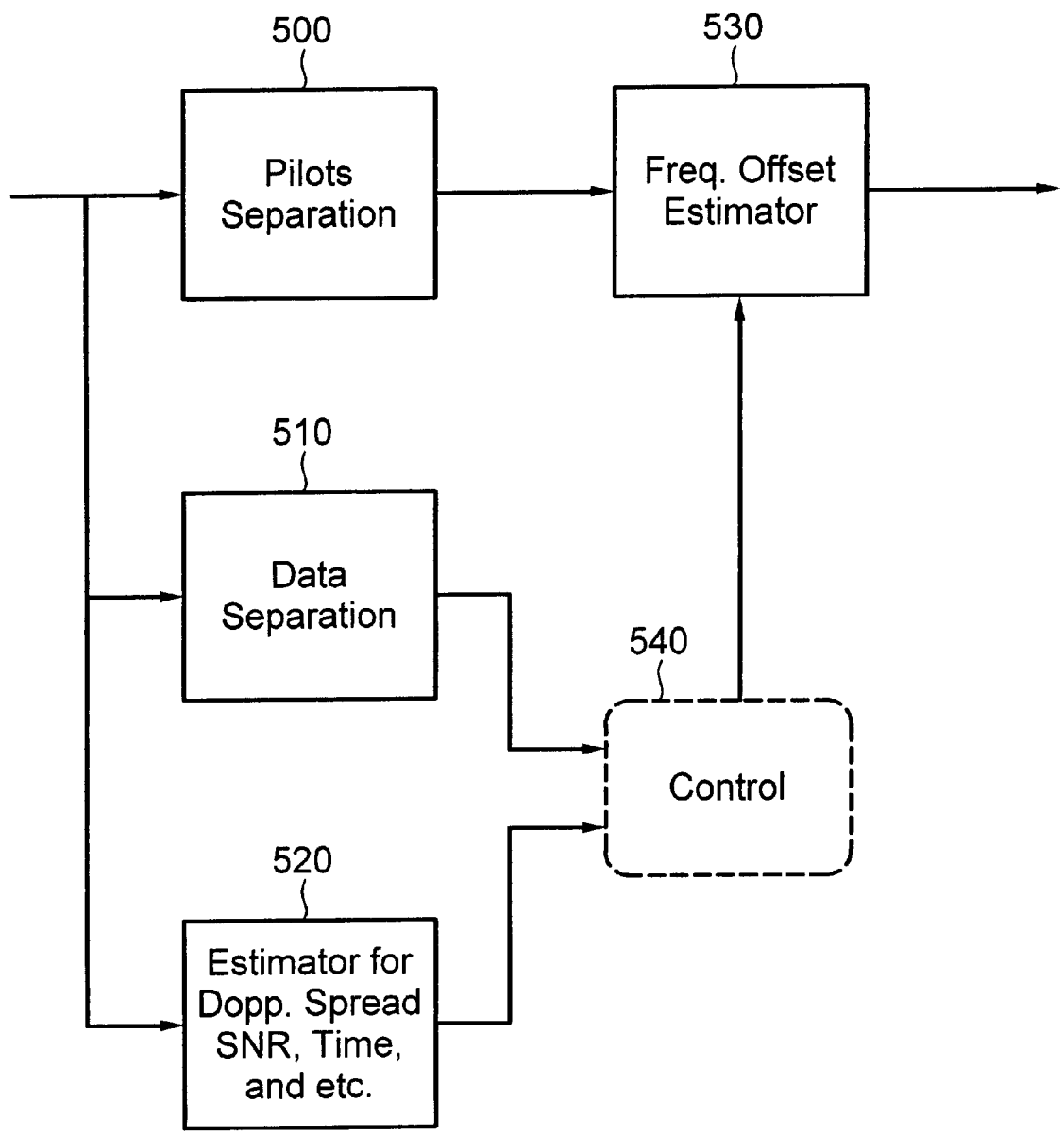
FIG. 5 illustrates an exemplary apparatus for estimating a frequency offset.

FIG. 5 illustrates an apparatus for estimating a frequency offset according to an exemplary embodiment. The apparatus includes a Pilot Separator 500, a Data Separator 510, an Estimator 520 for estimating parameters such as a Doppler spread, SNR, and available time for frequency offset estimation, a Frequency Offset Estimator 530, and a Controller 540. The locations of the pilot symbols being known, the Pilot Separator 500 separates the known pilot symbols from the received signal and outputs the pilot symbols to the Frequency Offset Estimator 530. The Data Separator 510 separates the data symbols from the received signal and outputs the data symbols to the Controller 540. The Controller 540 determines whether to use the data symbols as pilot symbols by analyzing, e.g., the estimated Doppler spread, the estimated SNR, and/or the estimated amount of available frequency offset estimation time as output by the Estimator 520.

The Doppler spread and SNR can be determined using, e.g., pilot symbols, data symbols, or a combination of these. For example, the Doppler spread can be determined based on analyzing the variation of the radio channel by using the received pilot and/or data symbols in a conventional manner. The SNR can be estimated by estimating signals and noise power in the received pilot and/or data symbols in a known manner. The estimation time is known. The Controller 540 can also pre-judge the reliability of the data symbols and provide weights in order to use the phases of the data symbols as the pilot phases, depending on the data symbol reliability. For example, the pilot symbols can be weighted by a first predetermined weight, and the data symbols can be weighted by a second predetermined weight, The pre-judgment can be based on, e.g., the estimated SNR. For example, for a low SNR, the first predetermined weight is larger than the second predetermined weight. Otherwise, the weights can be set to an equal amount.

Figure 1:
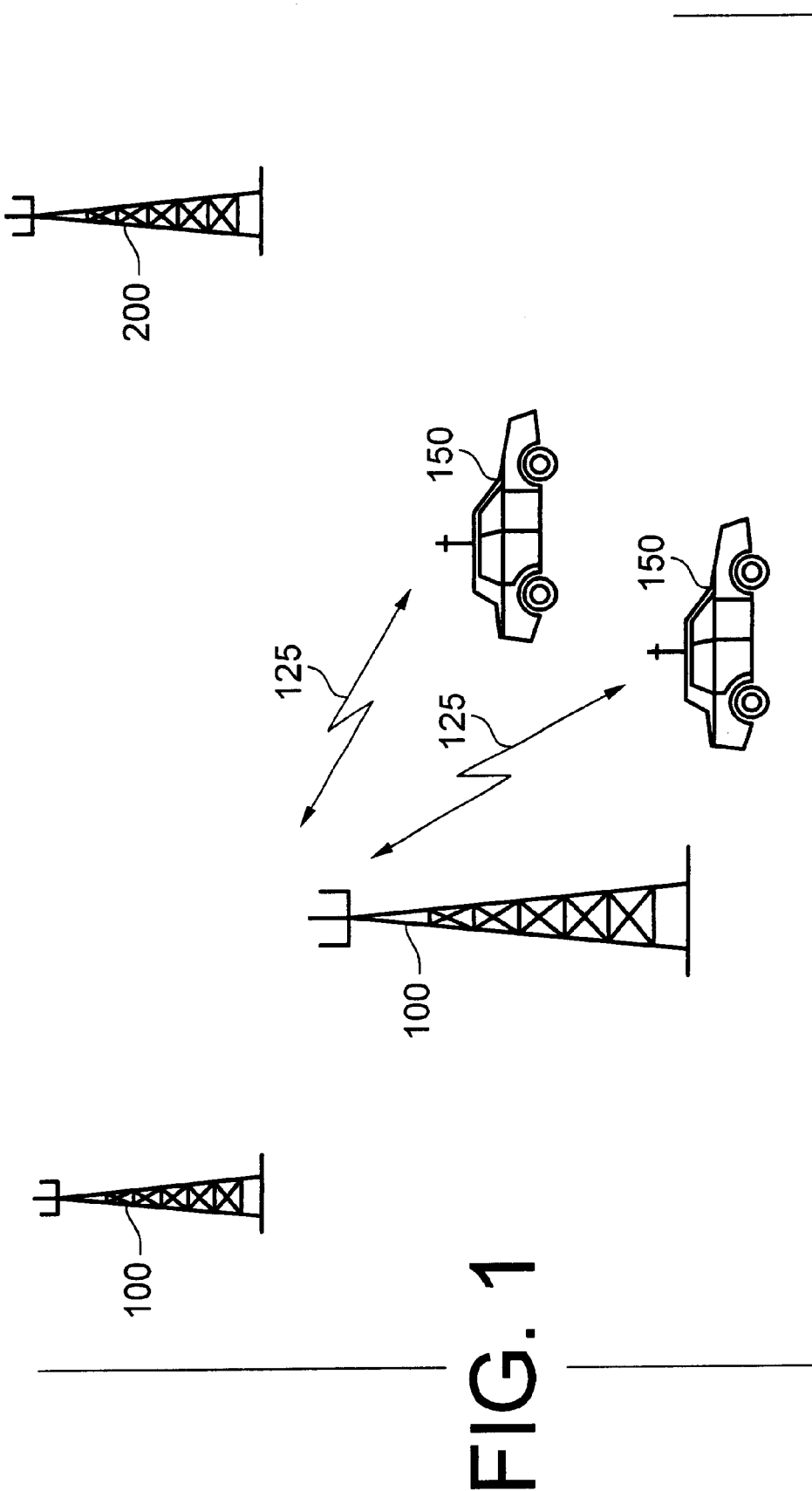
FIG. 1 is a block diagram of an exemplary cellular radiotelephone communication system.
Figure 2:
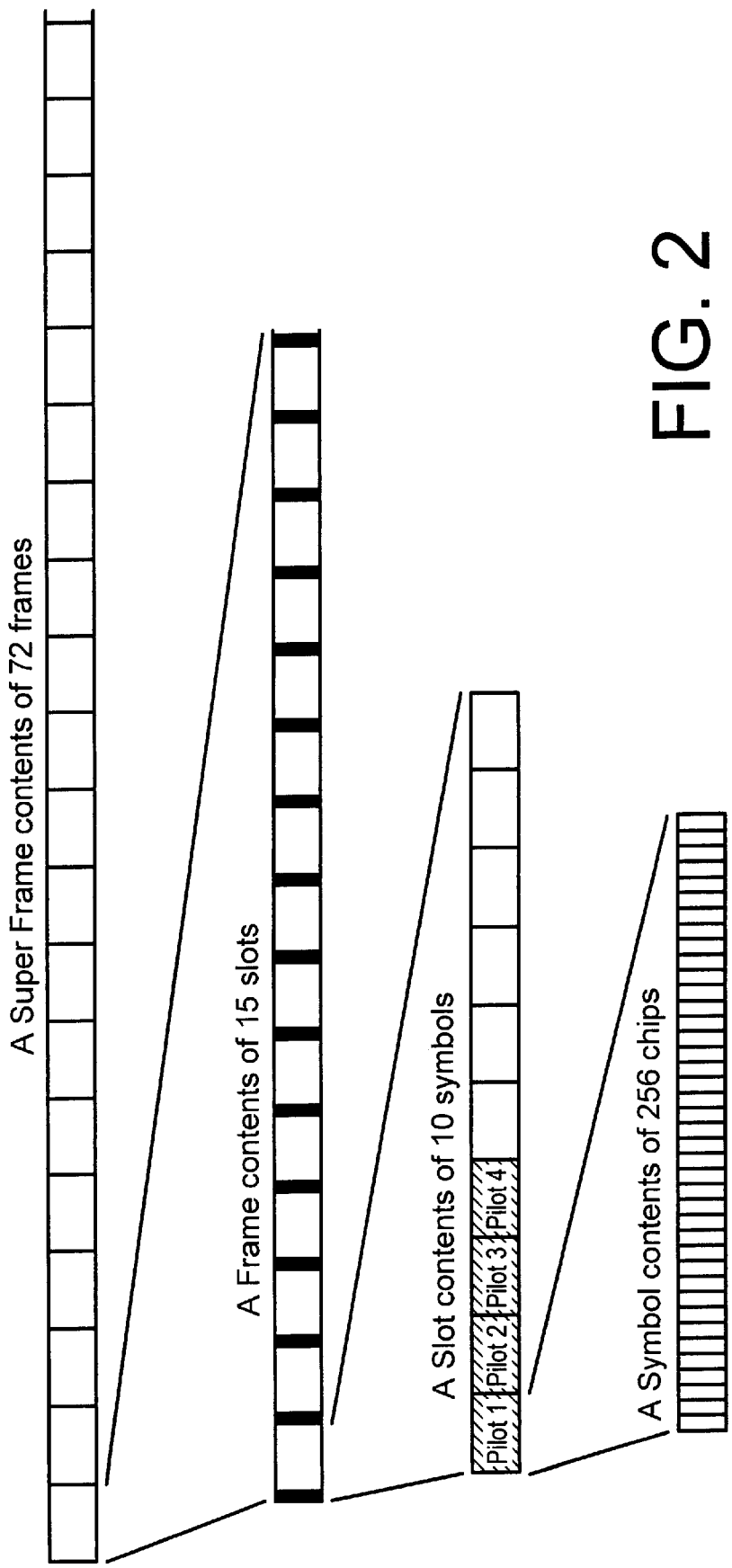
FIG. 2 illustrates a superframe structure in the BCCH in a W-CDMA system.
Figure 3:
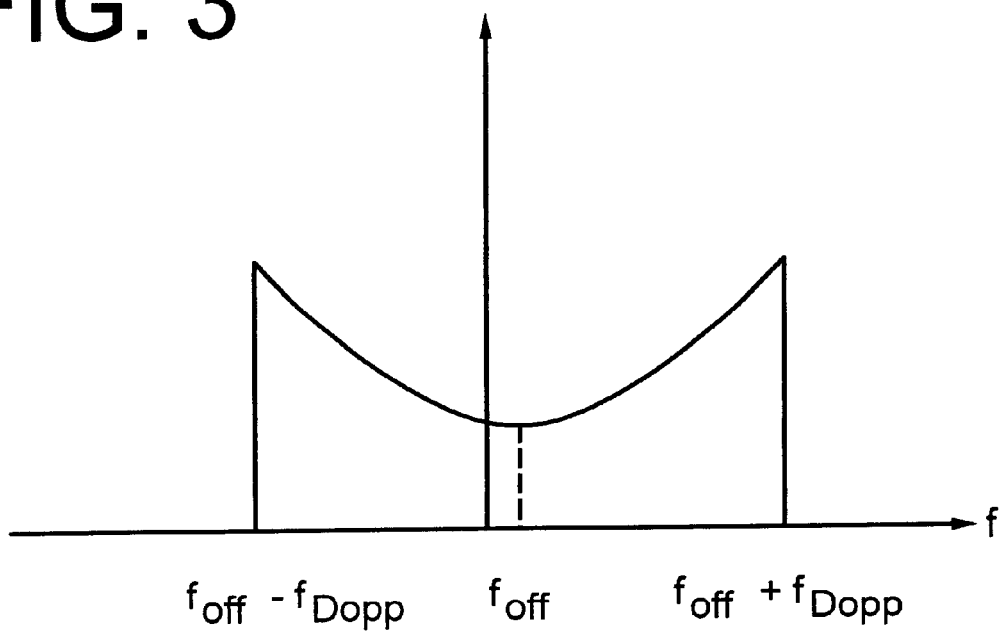
FIG. 3 illustrates a spectrum of a Rayleigh fading radio channel.
Figure 4:
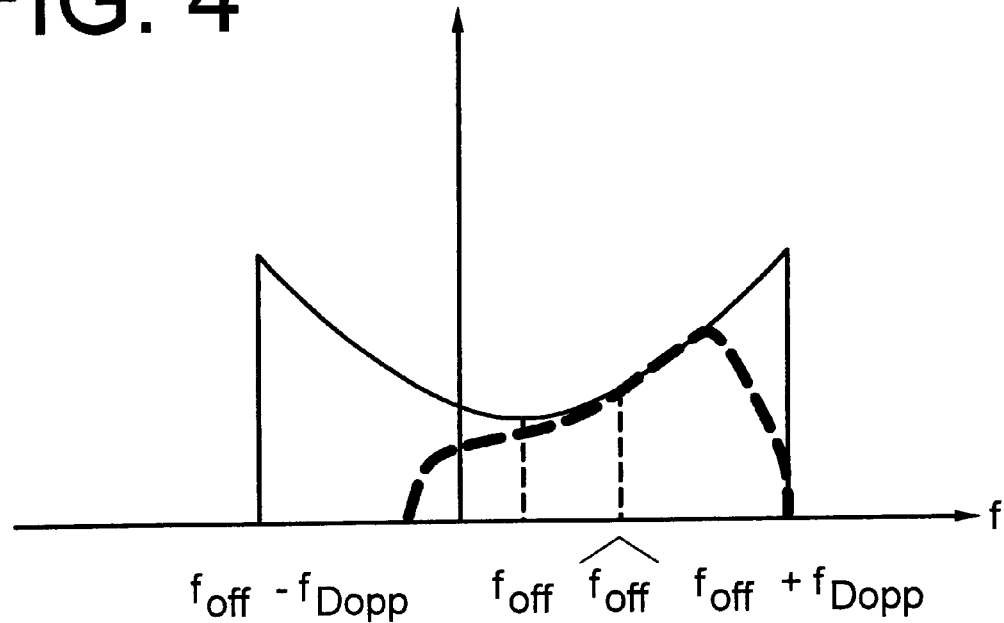
FIG. 4 illustrates a frequency zone of the received path-rays in limited time.

The Controller 540 decides whether to use data symbols as the pilot symbols to increase the pilot rate based on the estimated parameters. For example, if the Doppler spread is large, e.g., at high velocities, the SNR is low, and/or the estimation time is low, the Controller 540 decides to use both pilot and data symbols. The Controller 540 controls the Frequency Offset Estimator 530 to use pilot symbols and, if necessary, data symbols, to estimate the frequency offset. If both the pilot symbols and the data symbols are to be used, the phases of these symbols are combined in the Frequency Offset Estimator 530 according to the weights provided by the Controller 540. For example, the phases can be combined in the order pilot, data, pilot, data . . . . The elements shown in FIG. 5 can be implemented in, e.g., a receiver such as the receiver 120 shown in FIG. 1.

Figure 6:
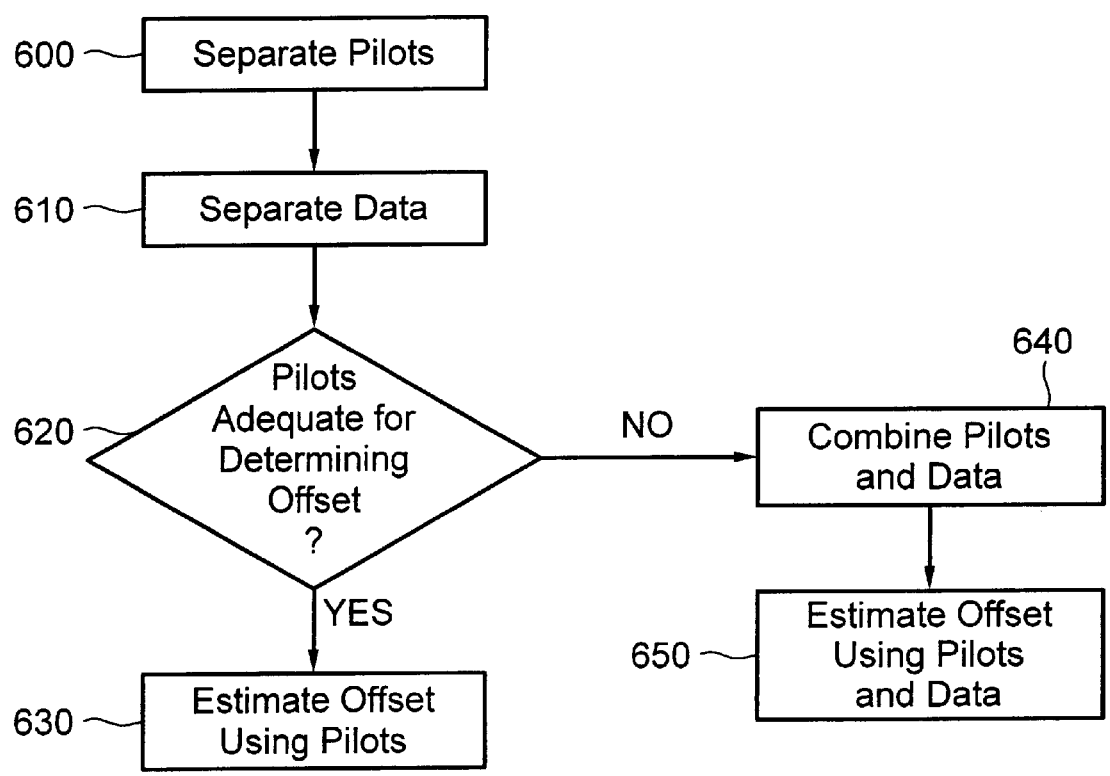
FIG. 6 illustrates an exemplary method for estimating a frequency offset.

FIG. 6 illustrates a method for estimating a frequency offset according to an exemplary embodiment. The method begins at step 600 at which the pilot symbols are separated from the received signal. At step 610, the data symbols are separated. It will be appreciated that these steps can be performed in any order or at the same time. At step 620, a determination is made whether the pilot symbols are adequate for estimating the frequency offset. This determination can be made based, e.g., on the estimated Doppler spread, SNR, time available for frequency offset estimation, etc. If the pilot symbols are determined to be adequate, the offset is estimated at step 630 using the pilot symbols. Otherwise, the pilot symbols and data symbols are combined at step 640, and the frequency offset is estimated using the pilot symbols and the data symbols.

According to exemplary embodiments, a frequency offset between a carrier frequency of a transmitter and a local reference frequency of a receiver can be estimated using pilot symbols, even where the pilot symbols are not adequate. The pilot symbols and the estimated data symbols may be combined to decrease the uncertainties of the estimated frequency offset between the local reference frequency crystal and the carrier frequency.

One skilled in the art will appreciate that this invention can be embodied in other specific forms without departing from its essential character. The embodiments described above should therefore be considered in all respects to be illustrative and not restrictive. For example, although described above with reference to a CDMA communication system, the invention is also applicable in other types of communication systems.

What is claimed is:

1. A method for estimating a frequency offset between a carrier frequency of a transmitter and a local reference frequency of a receiver, the method comprising the steps of:

separating a received signal into frequency synchronization signals and data;

determining whether the frequency synchronization signals are adequate for estimating the frequency offset; and estimating the frequency offset based on the determination result.

2. The method of claim 1, wherein if the frequency synchronization signals are determined to be adequate for estimating the frequency offset, the frequency synchronization signals are used for estimating the frequency offset.

3. The method of claim 1, wherein if the frequency synchronization signals are determined not to be adequate for estimating the frequency offset, the rate of the frequency synchronization signals is increased.

4. The method of claim 3, wherein the rate is increased by using the data as frequency synchronization signals.

5. The method of claim 4, further comprising combining the data with the frequency synchronization signals to estimate the frequency offset.

6. The method of claim 1, wherein the step of determining is based on an estimated Doppler spread.

7. The method of claim 1, wherein the step of determining is based on an estimated signal to noise ratio.

8. The method of claim 1, wherein the step of determining is based on an available amount of frequency offset estimation time.

9. The method of claim 1, wherein the frequency synchronization signals are pilot symbols.

10. The method of claim 1, wherein the transmitter is a base station, and the receiver is a remote station.

11. An apparatus for estimating a frequency offset between a carrier frequency of a transmitter and a local reference frequency of a receiver, the apparatus comprising:

a separator for separating a received signal into frequency synchronization signals and data;

a controller for determining whether frequency synchronization signals are adequate for estimating the frequency offset; and a frequency offset estimator for estimating the frequency offset based on the determination by the controller.

12. The apparatus of claim 11, wherein if the frequency synchronization signals are determined to be adequate for estimating the frequency offset, the frequency synchronization signals are used for determining the frequency offset.

13. The apparatus of claim 11, wherein if the frequency synchronization signals are determined not to be adequate for estimating the frequency offset, the rate of the frequency synchronization signals is increased.

14. The apparatus of claim 13, wherein the rate is increased by using the data as frequency synchronization signals.

15. The apparatus of claim 14, further comprising a combiner for combining the data with the frequency synchronization signals to estimate the frequency offset.

16. The apparatus of claim 11, wherein the controller determines whether the frequency synchronization signals are adequate based on an estimated Doppler spread.

17. The apparatus of claim 11, wherein the controller determines whether the frequency synchronization signals are adequate based on an estimated signal to noise ratio.

18. The apparatus of claim 11, wherein the controller determines whether the frequency synchronization signals are adequate based on an available amount of frequency offset estimation time.

19. The apparatus of claim 11, wherein the frequency synchronization signals are pilot symbols.

20. The apparatus of claim 11, wherein the transmitter is a base station, and the receiver is a remote station.

* * * * *